(12) United States Patent
Ha et al.

(10) Patent No.: US 9,498,884 B2
(45) Date of Patent: Nov. 22, 2016

(54) CROSSWALK WALKING ASSISTANCE SYSTEM AND METHOD OF CONTROLLING THE SAME

(75) Inventors: Tae Sin Ha, Seongnam-si (KR); Kyung Shik Roh, Seongnam-si (KR); Dong Min Shin, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 987 days.

(21) Appl. No.: 13/277,436

(22) Filed: Oct. 20, 2011

(65) Prior Publication Data

US 2012/0101632 A1    Apr. 26, 2012

(30) Foreign Application Priority Data

Oct. 26, 2010   (KR) .................. 10-2010-0104974

(51) Int. Cl.
*B25J 9/16*    (2006.01)
(52) U.S. Cl.
CPC ............. *B25J 9/162* (2013.01); *B25J 9/1669* (2013.01); *B25J 9/1682* (2013.01); *G05B 2219/40298* (2013.01); *G05B 2219/45108* (2013.01)
(58) Field of Classification Search
CPC ...... B25J 9/162; B25J 9/1669; B25J 9/1682; G05B 2219/45108; G05B 2219/40298
USPC ............ 700/245, 248, 253; 901/1, 46
See application file for complete search history.

(56) References Cited

U.S. PATENT DOCUMENTS

| | | | |
|---|---|---|---|
| 6,671,592 B1* | 12/2003 | Bisset et al. ............. | 701/23 |
| 2003/0123341 A1* | 7/2003 | Ostwald et al. ........ | 369/30.43 |
| 2004/0160595 A1* | 8/2004 | Zivkovic et al. ....... | 356/73 |
| 2011/0116967 A1* | 5/2011 | Roy et al. .............. | 422/22 |
| 2011/0160949 A1* | 6/2011 | Kondo ................... | 701/23 |

FOREIGN PATENT DOCUMENTS

KR    10-0960991 B1 *   6/2010

* cited by examiner

*Primary Examiner* — Thomas G Black
*Assistant Examiner* — Ce Li
(74) *Attorney, Agent, or Firm* — Harness, Dickey & Pierce, P.L.C.

(57) ABSTRACT

A crosswalk walking assistance system to assist a pedestrian by moving a movable robot along with the pedestrian along a boundary of a crosswalk when the pedestrian crosses at the crosswalk, and a method of controlling the same. The crosswalk walking assistance system includes guide rails formed along boundary lines of a crosswalk, robots moving along the guide rails, and a controller connected to the guide rails.

26 Claims, 8 Drawing Sheets

CROSSWALK WALKING ASSISTANCE SYSTEM AND METHOD OF CONTROLLING THE SAME

CROSS-REFERENCE TO RELATED APPLICATIONS

This application claims the benefit of Korean Patent Application No. 2010-104974, filed on Oct. 26, 2010 in the Korean Intellectual Property Office, the disclosure of which is incorporated herein by reference.

BACKGROUND

1. Field

Embodiments relate to a crosswalk walking assistance system to enable a pedestrian to safely cross at a crosswalk using a robot and a method of controlling the same.

2. Description of the Related Art

A pedestrian crosses at a crosswalk according to a signal of traffic lights. If a change period of the signal of the traffic lights is short or the number of pedestrians is large, the signal of the traffic lights may be changed even when the pedestrians have not finished crossing at the crosswalk.

This may cause a dangerous situation in a school zone in which children who are not well-acquainted with the traffic signals frequently walk. This also causes a dangerous situation in a zone in which the old and the infirm frequently walk.

For this reason, the school zone has been extended and a lot of money has been invested in traffic safety facilities. However, in spite of the investment in the traffic safety facilities, manpower for traffic control, such as traffic police or parent volunteers, is continuously required.

However, in this case, accidents of traffic police may be generated or parent volunteers may not have time to participate in a traffic safety service. Accordingly, there is a need for an automated traffic control method, instead of a traffic control method requiring manpower.

SUMMARY

Therefore, it is an aspect of an embodiment to provide a crosswalk walking assistance system to assist a pedestrian by moving a movable robot along with the pedestrian along a boundary of a crosswalk when the pedestrian crosses at the crosswalk, and a method of controlling the same.

Additional aspects of embodiments will be set forth in part in the description which follows and, in part, will be obvious from the description, or may be learned by practice of the embodiments.

In accordance with an aspect of an embodiment, there is provided a crosswalk walking assistance system including guide rails formed along boundary lines of a crosswalk, robots moving along the guide rails, and a controller connected to the guide rails.

The boundary lines may be both lines of a width of the crosswalk.

The robots may move along the guide rails formed on the boundary lines forward and backward and may be respectively provided to the guide rails.

Each of the guide rails may include a sensor to sense an object passing through each of the guide rails and the sensor may include a conductivity sensor and a pressure sensor.

The controller may be electrically connected to the guide rails, and the controller may include a power supply to supply power to the robot, and a communication unit to perform communication between traffic lights and the robot.

Each of the robots may include a driving unit, a sensor unit to sense variation in surrounding circumstances, a power reception unit to receive power, a communication unit to perform communication between the controller and the other robot, and a control unit to control the driving unit according to signals transmitted from the sensor unit and the communication unit.

Each of the robots may include a rotatable body.

The sensor unit may include a camera, an infrared sensor, a distance sensor and an obstacle sensor and a plurality of sensor units may be provided outside the robot.

At least one sensor unit may be provided outside the rotatable body of the robot.

The power reception unit may receive power from the controller through the guide rail.

The communication unit may receive a signal of traffic lights from the controller and transmit information sensed by the sensor unit to the other robot or receive information sensed by the sensor unit of the other robot.

In accordance with another aspect of an embodiment, there is provided crosswalk walking assistance system including guide lines formed along boundary lines of a crosswalk, robots moving along the guide lines, and controllers provided on ends of the guide lines.

Each of the robots may include a sensor to recognize the guide line, a docking unit which is in contact with the controller to receive power, and a battery to store power received from the controller.

The sensor may include an infrared sensor and a hall sensor.

The guide lines may have a color different from that of a road surface and have reflectivity different from that of the road surface.

The guide lines may include a magnetic material.

Each of the controllers may include a docking unit which is in contact with the robot to supply power, and a beacon signal unit to transmit a beacon signal to the robot so as to recognize the position of the robot.

In accordance with another aspect of an embodiment, there is provided a method of controlling a crosswalk walking assistance system, including an obstacle sensor of a robot sensing whether or not an obstacle is present on a movement path of the robot if information indicating that a signal of traffic lights is changed to a walk signal is received from a controller, moving the robot along a guide rail or a guide line while outputting a voice signal indicating that the signal is changed to the walk signal, if the obstacle is not present, determining whether or not the obstacle is a person if the obstacle is present and outputting a voice signal recommending that the person move to the inside of a crosswalk if the obstacle is a person, generating an alert signal to remove the obstacle if the obstacle is not a person, moving the robot along the guide rail or the guide line while outputting a voice signal indicating that the signal has changed to the walk signal if the obstacle is removed, and outputting an indication that the signal has changed to a stop signal if movement to the other side of the crosswalk is completed and waiting until the signal is changed to the walk signal.

The signal of the traffic lights may be transmitted from the controller through the guide rail or may be wirelessly transmitted to the robot.

The determining of whether or not the obstacle is a person may include measuring a temperature of the obstacle using an infrared sensor of the robot so as to determine whether or not the obstacle is a person, measuring a conductivity level of the obstacle using a conductivity sensor of the guide rail so as to determine whether or not the obstacle is a person, if the temperature is not within a predetermined range, measuring pressure generated by the obstacle using a pressure sensor of the guide rail so as to determine whether or not the obstacle is a person, if the conductivity level is not within a predetermined range, measuring a variation in distance based on a movement speed of the obstacle using a distance sensor of the robot so as to determine whether or not the obstacle is a person, if the pressure is not within a predetermined range, photographing the obstacle using a camera of the robot so as to determine whether or not the obstacle is a person based on the photographed image, if the variation in distance is not within a predetermined range, and determining that the obstacle is a vehicle if the image is not a person.

The predetermined ranges may be ranges of information measured by the sensors when the obstacle is a person.

The moving of the robot along the guide rail or the guide line may include moving robots, which are located on guide rails or guide lines provided on both boundary lines of the crosswalk so as to face each other in a diagonal direction, in opposite directions.

The moving of the robot along the guide rail or the guide line may include transmitting a signal for requesting extension of a walk signal time to the controller and extending the walk signal time, if the movement of the robot at the crosswalk is not completed within a walk signal time.

The moving of the robot along the guide rail or the guide line may include, if a walk signal time is insufficient to move the robot at the crosswalk, increasing a movement speed of the robot can be moved to the other side of the crosswalk at a predetermined upper-limit movement speed and returning the robot to an original position if the robot cannot be moved to the other side of the crosswalk at the predetermined upper-limit movement speed.

BRIEF DESCRIPTION OF THE DRAWINGS

These and/or other aspects of embodiments will become apparent and more readily appreciated from the following description of the embodiments, taken in conjunction with the accompanying drawings of which.

DETAILED DESCRIPTION

Figure 1:
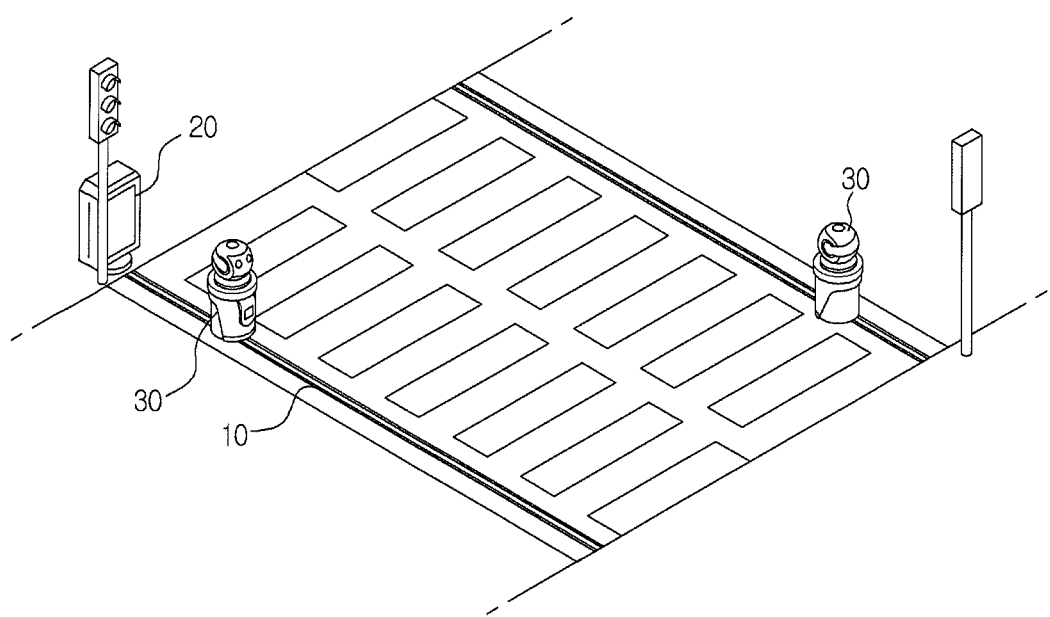
FIG. 1 is a schematic diagram showing a crosswalk walking assistance system according to an embodiment.

Reference will now be made in detail to embodiments, examples of which are illustrated in the accompanying drawings, wherein like reference numerals refer to like elements throughout.

FIG. 1 is a schematic diagram showing a crosswalk walking assistance system according to an embodiment.

Referring to FIG. 1, the crosswalk walking assistance system includes guide rails 10, robots 30 which move along the guide rails 10 and a controller 20 connected to the guide rails 10.

Two guide rails 10 may be provided on boundary lines of both sides of a width of a crosswalk. The length of the guide rails 10 is equal to that of the crosswalk. The guide rails 10 may be mounted in grooves formed in a road or may be mounted such that the upper surfaces of the guide rails 10 are on the same plane as the surface of the road so as not to obstruct the running of a vehicle (see FIG. 2).

The robot 30 may move from one side to the other side of the crosswalk along the guide rail 10. The robot 30 moves from one side to the other side of the crosswalk so as to enable a pedestrian to safely cross at the crosswalk along the guide rail 10 when a signal changes from a stop signal to a walk signal. Two robots 30 are arranged on the guide rails 10, respectively.

The controller 20 is provided on one end of one of the guide rails 10 so as to be electrically connected to the guide rail 10. The controller 20 serves to supply power to the robot 30 through the guide rail 10. Accordingly, if the controller 20 is connected to only one of the guide rails 10, then the guide rails 10 may be electrically connected to each other in order to supply power to the robot 30 arranged on the other guide rail 10. The guide rails may be connected using any known method. Two controllers 20 may be connected to the guide rails 10, respectively. In this case, the guide rails 10 need not be electrically connected to each other.

Figure 2:
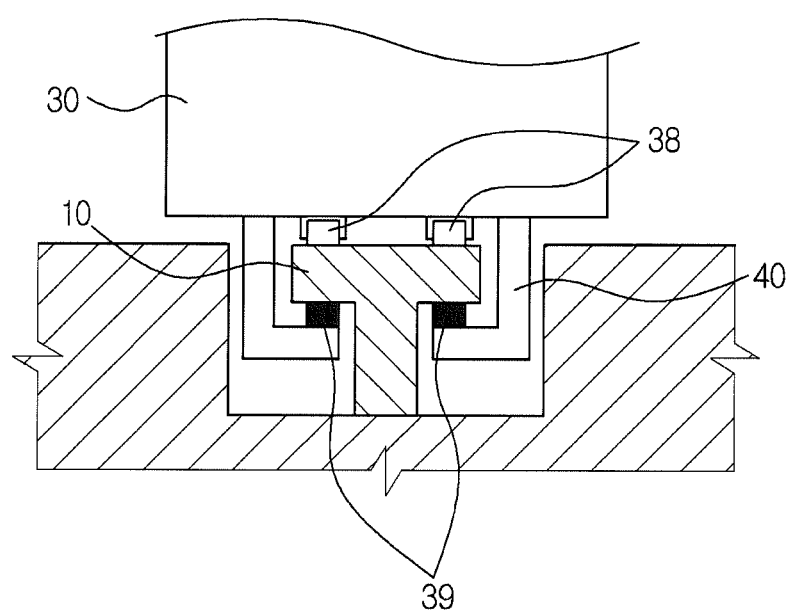
FIG. 2 is a longitudinal cross-sectional view showing a state of connecting a robot and a guide rail according to an embodiment.

FIG. 2 is a longitudinal cross-sectional view showing a state of connecting a robot 30 and a guide rail 10 according to an embodiment.

Referring to FIG. 2, the robot 30 moves along the guide rail 10 forward and backward in a state in which two wheels 38 are tightly adhered to the upper surface of the guide rail 10. Although the number of wheels 38 is preferably two such that the robot stably moves along the guide rail 10, the number of wheels 38 may also be one or three. If the number of wheels 38 is one, the area of the wheel 38 which is in contact with the guide rail 10 is greater than the area of the two wheels 38 which are in contact with the guide rail 10, in order to secure stable movement of the robot 30.

The robot 30 may receive power from the controller 20 through the guide rail 10 and receive various signals necessary to assist walking. Accordingly, the robot 30 may include contact portions 39 electrically connected to the guide rail 10 in order to receive power and signals through the guide rail 10. The contact portions 39 may be mounted on a guide member 40 so as to be in contact with the guide rail 10 as shown in FIG. 2. Although the power and the signals may be received through the wheels 38, it is preferable that the contact portions 39 are separately provided, for stable signal reception.

Figure 3:
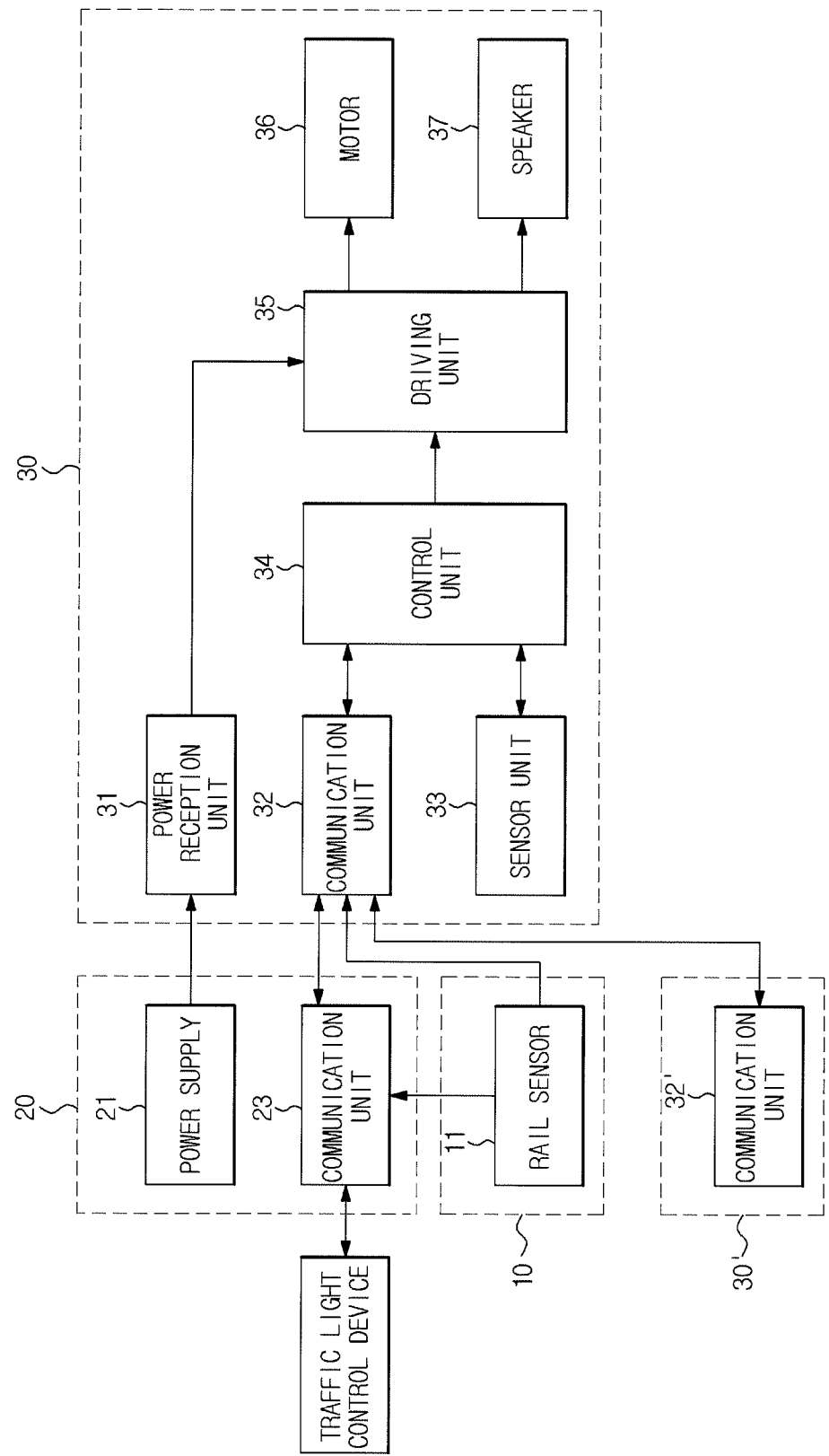
FIG. 3 is a block diagram showing the configuration of a crosswalk walking assistance system according to an embodiment.

FIG. 3 is a block diagram showing the configuration of a crosswalk walking assistance system according to an embodiment.

The crosswalk walking assistance system includes the guide rail 10, the controller 20 and the robot 30.

The guide rail 10 includes a pressure sensor or a conductivity sensor.

The sensor measures pressure or conductivity generated when an obstacle is placed on the guide rail 10 and transmits information about the pressure or conductivity level to the controller 20 or the robot 30.

The controller 20 includes a power supply 21 and a communication unit 23.

The power supply 21 supplies power to the robot 30. The power supplied from the power supply 21 is transmitted to the robot 30 through the guide rail 10.

The communication unit 23 receives a signal of traffic lights from a traffic light control device for controlling a signal of traffic lights and receives the information sensed by the pressure sensor or the conductivity sensor of the guide rail 10. The information is transmitted to the robot 30. If the signal of the traffic lights is changed, the controller 20 sends the change information to the robot 30 such that the robot 30 recognizes whether or not the traffic signal has changed.

The communication unit 23 may transmit a signal requesting extension of the period of the traffic signal, more particularly the walk signal, to the traffic light control device if necessary. If such a signal is transmitted to the traffic light control device, the signal light control device extends the period of the walk signal.

The robot 30 includes a power reception unit 31, a communication unit 32, a sensor unit 33, a control unit 34 and a driving unit 35.

The power reception unit 31 receives power from the power supply 21 of the controller 20 through the guide rail 10. The power received by the power reception unit 31 is sent to the communication unit 32, the sensor unit 33, the control unit 34 and the driving unit 35 such that the robot 30 assists walking. The power supply 21 may include a battery to store received power.

The communication unit 32 of the robot 30 receives the signal of the traffic lights from the communication unit of the controller 20 and the information sensed by the pressure sensor or the conductivity sensor of the guide rail 10. The information sensed by the pressure sensor or the conductivity sensor of the guide rail 10 may be directly sent to the communication unit 32 of the robot 30 through the contact portions 39 of the robot 30 without passing through the communication unit 23 of the controller 20.

The communication unit 32 of one robot 30 may exchange information with the communication unit of the other robot 30. One robot 30 may transmit information about surrounding circumstances measured by the sensor unit 33 to the other robot 30 and receive information measured by the other robot 30, thereby more accurately recognizing variation in surrounding circumstances.

The communication unit 32 transmits the signal received from the communication unit 23 of the controller 20, the pressure sensor or the conductivity sensor of the guide rail 10 or the communication unit 32 of the other robot 30 to the control unit 34.

The sensor unit 33 senses variation in surrounding circumstances of the robot 30 such that the robot 30 recognizes such variation. In particular, the sensor unit 33 senses an obstacle present in a movement direction of the robot 30 when the robot 30 moves such that the robot 30 recognizes the obstacle.

The sensor unit 33 may include an obstacle sensor, an infrared sensor, a distance sensor and a camera.

The obstacle sensor is an on/off sensor to sense whether or not an obstacle obstructing the movement of the robot 30 is present in the movement direction of the robot 30 and sends the sensed information to the control unit 34. If an obstacle is present, an on signal is sent to the control unit 34 and, if no obstacle is present, an off signal is sent to the control unit 34.

The infrared sensor senses temperature, pressure or radiation intensity using infrared light and converts the sensed information into an electrical signal. The infrared sensor includes an active sensor including a light emitting portion to emit infrared light and a light receiving portion to receive infrared light so as to sense variation in infrared light emitted by the light emitting portion and received by the light receiving portion and a passive sensor to sense variation in external infrared light without including a light emitting portion to emit infrared light. The robot 30 of the crosswalk walking assistance system according to embodiment may include both the active sensor and the passive sensor.

The infrared sensor may sense whether or not an obstacle is present on the movement path of the robot 30 and send the sensed information to the controller 34, similar to the obstacle sensor. Since the infrared sensor senses infrared light emitted from an obstacle or infrared light reflected from an obstacle and sends the information changed according to the kind of the obstacle to the control unit 34, the infrared sensor may be used to determine whether or not the obstacle is a person, unlike the obstacle sensor which is the on/off sensor.

The distance sensor measures a distance from a specific object. The distance sensor includes an ultrasonic sensor and a laser sensor. The ultrasonic sensor emits an ultrasonic wave and measures a time taken for the emitted ultrasonic wave reflected from a surface of an object to return to the ultrasonic sensor, thereby obtaining distance information of the object.

The laser sensor emits a laser and measures a time taken for the emitted laser reflected from an object to return to the laser sensor, thereby obtaining distance information of the object.

Although the distance measured by the ultrasonic sensor is generally about 3 or 4 meters, since a sound wave is used instead of light, sound wave interference may occur and thus erroneous sensing may occur according to the shape of the surface of the object. The distance sensor of the robot 30 according to an embodiment may include both an ultrasonic sensor and a laser sensor, for more accurate distance measurement.

The distance sensor senses whether or not an obstacle is present on the movement path of the robot 30 and sends the sensed information to the control unit 34, similar to the obstacle sensor. The distance sensor senses variation in the distance from an obstacle and sends the sensed information to the control unit 34. Since the variation in distance is changed according to the movement speed of the obstacle and the movement speed may be changed according to whether or not the obstacle moves or the kind of the obstacle, the distance sensor may be used to determine whether or not the obstacle is a person unlike the obstacle sensor which is the on/off sensor.

The camera includes a CCD camera or a CMOS camera. The camera directly photographs the periphery of the robot and sends the photographed image to the control unit 34. The camera directly photographs the obstacle on the movement path of the robot 30 and sends the photographed image to the control unit 34. Since the camera directly photographs the obstacle, a determination as to whether the obstacle is a vehicle, a person, or other objects is made, unlike the obstacle sensor which is the on/off sensor. Accordingly, in a process of determining whether or not the obstacle is a person, the camera may be used when it is not determined whether or not the obstacle is a person using the information sensed by the other sensors.

The sensor unit 33 may be provided outside the body of the robot 30 in order to sense variation in the external state of the robot 30. In order to accurately sense the external state, a plurality of sensor units 33 may be provided outside the body of the robot 30. For example, four or eight sensor units may be provided outside the body of the robot 30 at the same interval. As the number of sensor units 33 is increased, variation in external state can be more accurately sensed. If the body of the robot 30 is rotatable, the number of sensor units 33 provided on the body of the robot 30 is decreased as compared to the case where the body of the robot 30 is not rotatable, because, when the body of the robot 30 is rotatable, variation in external state may be sensed using only one or two sensor units 33.

The control unit 34 is a microcomputer to control the driving unit 35 according to the signals transmitted from the sensor unit 33 and the communication unit 32 and transmit the information generated by analyzing the signals transmitted from the sensor unit 33 and the communication unit 32 to the controller 20 or the other robot 30 through the communication unit 32, thereby controlling the overall function of the robot 30 to assist a pedestrian in walking at the crosswalk.

When the change information of the traffic signal of the traffic lights is received from the controller 20, the control unit 34 controls the driving unit 35 so as to output the information through a speaker 37. If the traffic signal is changed to the walk signal and an obstacle is not present within the crosswalk, a voice signal indicating that it is safe to cross the crosswalk may be output. If the traffic signal changes the stop signal, a voice signal indicating that the traffic signal has changed to the stop signal and the pedestrian should await the next walk signal may be output. Even when the traffic signal is changed to the walk signal, if an obstacle obstructing walking is present within the crosswalk, an alert signal to request the obstacle from deviating from the crosswalk while alerting of danger may be output. If a pedestrian walks along the boundary line of the crosswalk or outside the boundary line of the crosswalk, a voice signal for recommending that a pedestrian walks inside the crosswalk may be output.

When the signal of the traffic lights is changed to the walk signal, the control unit 34 controls the driving unit 35 to move the robot 30 along the guide rail 10 to the other side of the crosswalk.

The length of a crosswalk, a walk signal time, and an upper limit of a movement speed of the robot 30 may be input to the control unit 34 in advance. The control unit 34 may compare the remaining movement distance and the remaining walk signal time while the robot 30 moves and transmit a signal for requesting the extension of the walk signal time to the controller 20 so as to extend the walk signal time if the movement is not completed during the remaining time, that is, the robot does not arrive at the other side of the crosswalk even at a maximum movement speed. If the robot can arrive at the other side of the crosswalk at the maximum movement speed, the control unit 34 increases the movement speed of the robot 30 so as to arrive at the other side of the crosswalk within the walk signal time. If the robot cannot arrive at the other side of the crosswalk but can move to the original position during the remaining time, the control unit 34 controls the driving unit 35 such that the robot returns to the original position.

The control unit 34 determines whether or not an obstacle is present on the movement path of the robot 30 using the information transmitted from the sensors of the sensor unit 33.

The control unit 34 determines whether or not the obstacle is a person if the obstacle is present. The control unit 34 determines that the obstacle is a person, if the information transmitted from the sensor unit 33 and the information transmitted from the conductivity sensor and the pressure sensor of the guide rail 10 are included in reference information previously input to the control unit 34. For example, the reference information may include a person's temperature (35° C. to 40° C.), a distance variation pattern based on a person's walking speed (distance variation pattern when a person moves at a speed of 3 to 7 km/hour), a pressure range based on a person's weight (pressure range of 10 kg to 150 kg), and conductivity and a pedestrian image.

When the robot 30 is in a standby state for a stop signal, the sensor unit 33 measures information about vehicles which run on the road and the control unit 34 computes the speed of the vehicles using the measured information. If the speed of the vehicle exceeds a predetermined speed, the control unit 34 controls the camera to photograph the vehicle.

Hereinafter, a method of measuring the speed of the vehicle by the control unit 34 in a state in which the robot 30 is in a standby state will be described. Two robots 30 are referred to as a first robot and a second robot. If the first robot senses an obstacle, the first robot informs the second robot that the obstacle is sensed. The obstacle may be sensed by the sensor of the guide rail 10 and transmitted to the first robot or may be sensed by the sensor unit 33 of the robot.

If the obstacle disappears within a predetermined time (about 1 second), that is, if the obstacle is not sensed, after the obstacle is sensed, the first robot informs the second robot that the obstacle passes through the boundary line of one side of the crosswalk in which the first robot is located.

The second robot determines that the obstacle is a running vehicle when receiving the information indicating that the obstacle is sensed and the information indicating that the obstacle passes through the boundary line from the first robot with a predetermined time interval (about 1 second).

If the obstacle disappears within a predetermined time (about 1 second), that is, if the obstacle is not sensed, after the obstacle is sensed by the second robot, the second robot determines that the obstacle passes through the boundary line of the other side of the crosswalk in which the second robot is located.

The second robot computes the speed of the vehicle using a time when the obstacle passes through the first robot, a time when the obstacle passes through the second robot, and the width of the crosswalk through which the obstacle passes.

If a traffic accident occurs while the robot 30 is in a standby state, the control unit 34 controls the camera to photograph the scene of the accident with a predetermined period after recognizing the accident. The traffic accident occurs in various forms. It may be determined that a traffic accident occurs if a remarkable variation in speed of the vehicle (e.g., a sudden stop of a vehicle). Then, the scene of the accident is photographed with the predetermined period.

The driving unit 35 drives a motor 36 and the speaker 37 according to a command of the control unit 34. The motor 36 rotates the wheels 38 such that the robot 30 moves along the guide rail 10 and rotates the body if the robot 30 includes a rotatable body.

Figure 4:
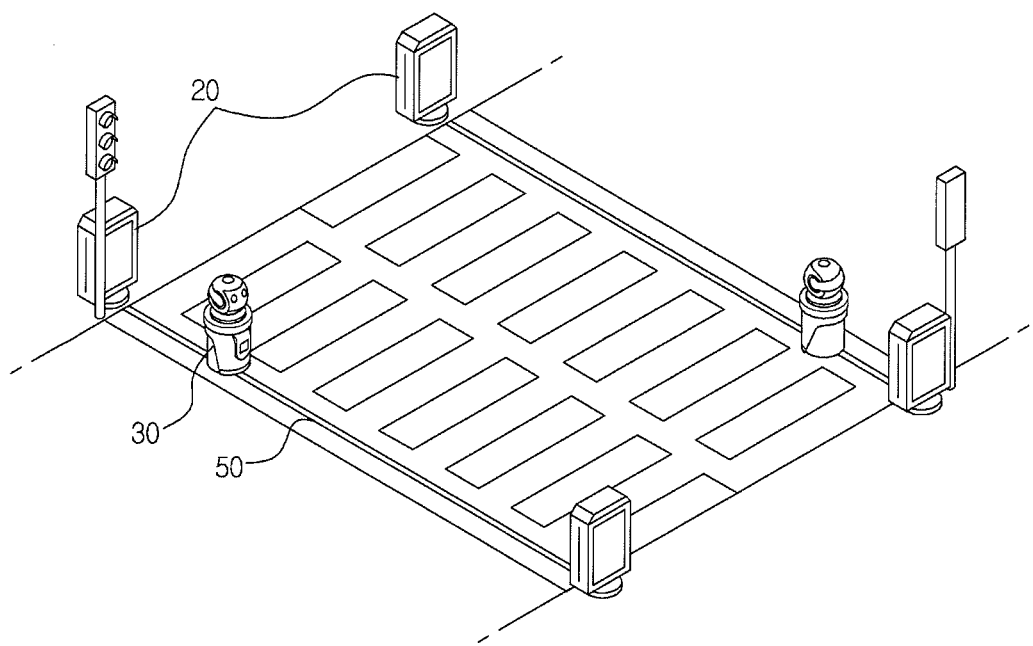
FIG. 4 is a schematic diagram showing a crosswalk walking assistance system according to an embodiment.

FIG. 4 is a schematic diagram showing a crosswalk walking assistance system according to an embodiment.

Referring to FIG. 4, the crosswalk walking assistance system includes guide lines 50, robots 30 which move along the guide lines 50 and controllers 20 provided on ends of the guide lines 50.

The other configuration is equal to that of the crosswalk walking assistance system including the guide rail 10 of FIG. 1 and thus only a difference therebetween will be described.

Two guide lines 50 may be provided on both boundary lines of the width w of the crosswalk. The length of the guide line 50 corresponds to the length of the crosswalk.

The guide line 50 has reflectivity different from that of a road surface. For example, since the color of an asphalt-paved road is black, the color of the guide line 50 may be white. The robot 30 may recognize the guide line 50 using an infrared sensor and move along the guide line 50.

Since the guide line 50 is provided outdoors, the guide line may be contaminated by contaminants such as dust and thus the reflectivity of the guide line may be changed. Accordingly, the guide line 50 may have a magnetic material such that the robot 30 accurately recognizes the guide line 50 without error. If the guide line 50 includes a magnetic material, the robot 30 may recognize the guide line 50 using a hall sensor.

The robot 30 may move along the guide line 50 from one side to the other side of the crosswalk. The robot 30 enables a pedestrian to safely walk inside the crosswalk while moving along the guide line 50 to the other side of the crosswalk, if a stop signal is changed to a walk signal. Two robots 30 may be provided on the guide lines 50, respectively.

The controllers 20 are provided on both ends of the two guide lines 50 provided on both boundary lines of the crosswalk. Since the controllers 20 do not supply power to the robots 30 through the guide line 50 unlike the case of using the guide rail 10, the controllers 20 supply power to the robots 30 in a state of directly contacting the robots 30. A total of four controllers 20 may be provided on both ends of the two guide lines 50 such that the power is supplied to the robots 30 in a state in which the robots 30 are in a standby state.

Figure 5:
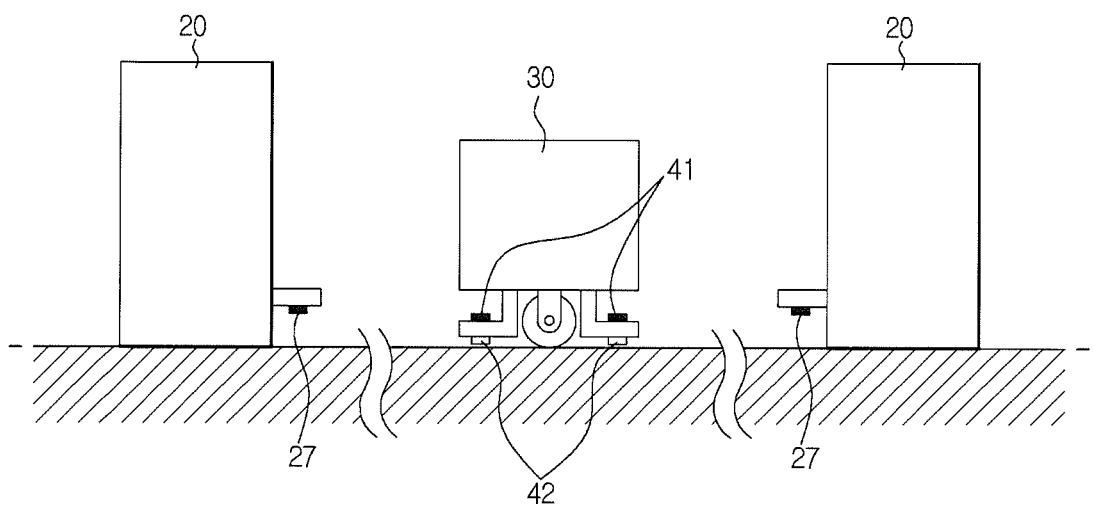
FIG. 5 is a cross-sectional view showing a state of connecting a robot and a controller according to an embodiment.

FIG. 5 is a cross-sectional view showing a state of connecting a robot 30 and a controller 20 according to an embodiment.

Referring to FIG. 5, the robot 30 includes a sensor to sense the guide line 50 and a docking unit 41 which is in contact with the controller 20 to receive power, in a guide member 40 provided on a lower surface of the robot 30.

The controller 20 includes a docking unit 27 which is in contact with the docking unit 41 of the robot 30 to supply power. The docking unit 41 of the robot 30 and the docking unit 27 of the controller 20 are formed of a conductive material, for power transfer. Since the docking units 41 and 27 are used to transfer power through contact, the docking units may have any structure enabling such function to be performed. The docking units 41 and 27 may be used to perform communication between the controller 20 and the robot 30.

Figure 6:
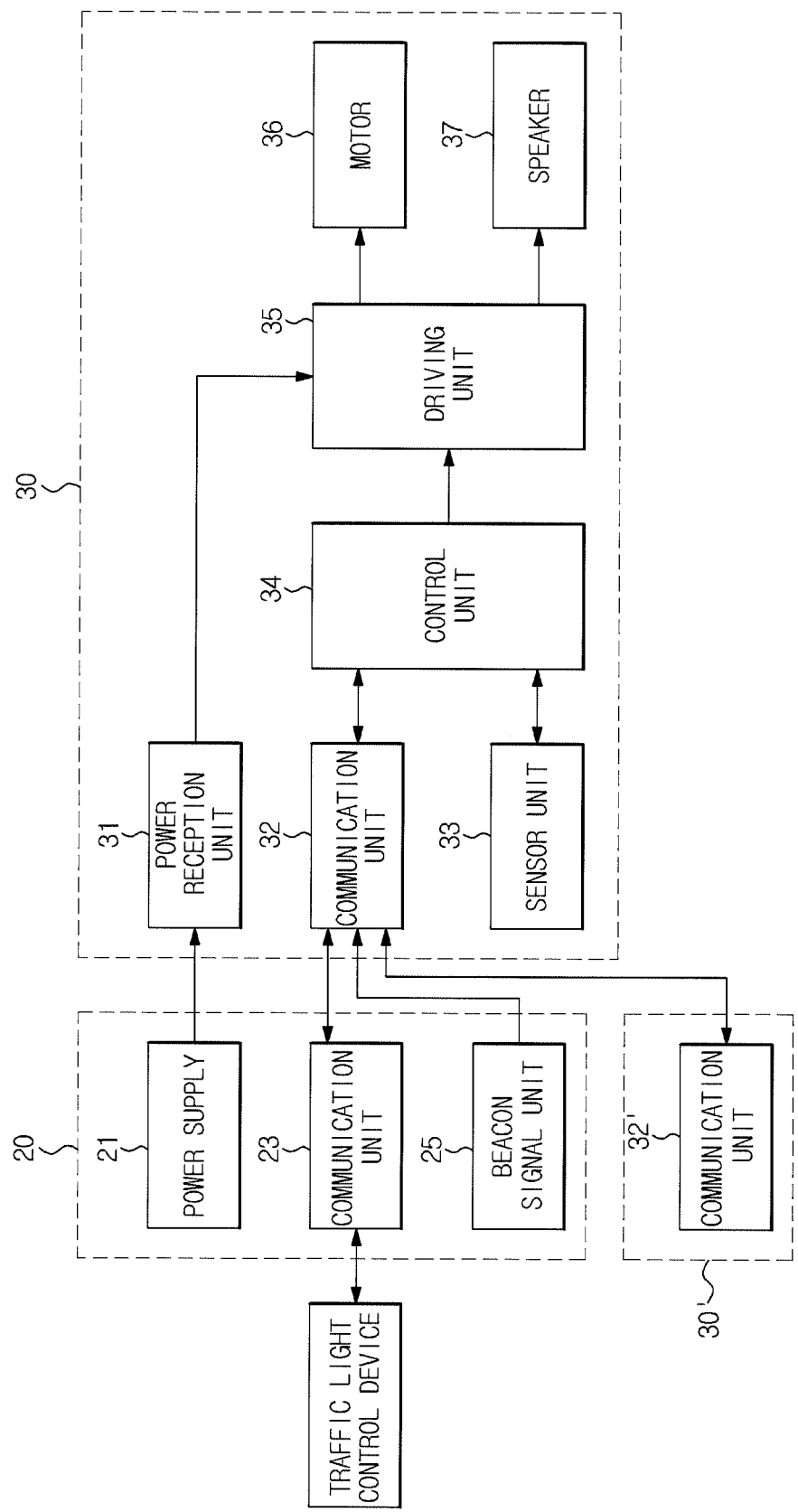
FIG. 6 is a block diagram showing the configuration of a crosswalk walking assistance system according to an embodiment.

FIG. 6 is a block diagram showing the configuration of a crosswalk walking assistance system according to an embodiment.

The crosswalk walking assistance system includes the guide line 50, the controller 20 and the robot 30.

The controller 20 includes a power supply 21, a communication unit 23 and a beacon signal unit 25.

The power supply 21 supplies power to the robot 30. The power supply 21 supplies power to the robot 30 through electrical contact between the docking unit 27 of the controller 20 and the docking unit 41 of the robot 30.

The communication unit 23 performs the same function as the communication unit 23 shown in FIG. 3 and a repeated description thereof will be omitted herein. Since the guide line 50 does not include the sensor unlike the guide rail 10, the communication unit 23 is different from the communication unit 23 shown in FIG. 3 in that the signal is not received from the guide line 50.

The robot 30 includes a power reception unit 31, a communication unit 32, a sensor unit 33, a control unit 34, and a driving unit 35. Since the robot 30 performs the same function as the robot 30 shown in FIG. 3, a repeated description thereof will be omitted herein and only a difference therebetween will be described.

The power reception unit 31 directly receives power from the power supply 21 of the controller 20 through electrical contact between the docking unit 27 of the controller 20 and the docking unit 41 of the robot 30. The power supplied to the power reception unit 31 is transferred to the communication unit 32, the sensor unit 34 and the driving unit 35 such that the robot performs a walking assistance function. The power supply 21 includes a battery to store received power.

The communication unit 32 of the robot 30 receives signal of the traffic signal information of the traffic lights from the communication unit 23 of the controller 20 and a beacon signal from the beacon signal unit 25.

The sensor unit 33 may sense variation in surrounding circumstances of the robot 30 and send the variation to the robot 30. Since the robot 30 moves along the guide line 30 unlike FIG. 3, the sensor unit 33 further includes an infrared sensor or a hall sensor provided on the lower surface of the robot 30 to recognize the guide line 50. The infrared sensor recognizes the guide line 50 having different reflectivity from that of the road surface such that the robot 30 accurately moves without deviating from the guide line 50.

Since the guide line 50 is provided outdoors, the guide line may be contaminated by contaminants such as dust and thus the reflectivity of the guide line may be changed. Accordingly, the guide line 50 may have a magnetic material such that the robot 30 accurately recognizes the guide line 50 without error. If the guide line 50 includes a magnetic material, the robot 30 may recognize the guide line 50 using a hall sensor.

Although the robot 30 may include any one of the infrared sensor or the hall sensor in order to recognize the guide line 50, the robot 30 may include both the infrared sensor and the hall sensor, in order to more accurately recognize the guide line 50.

Since the control unit 34 performs the same function as the control unit 34 shown in FIG. 3, a repeated description thereof will be omitted herein and only a difference therebetween will be described.

The control unit 34 receives the beacon signal from the beacon signal unit 25 of the controller 20 through the communication unit 32. The control unit 34 may recognize the position of the robot 30 using the received beacon signal. If the beacon signal is transmitted from the four controllers 20 to the robot 30, the control unit 34 computes the position of the robot by triangulation using three beacon signals. The remaining beacon signal may be used to correct error of the computed position. If the robot 30 moves along the guide line 50, since the guide line 50 has poor movement stability as compared to the guide rail 10, the robot 30 recognizes the current position thereof through the beacon signals so as to stably move along the guide line 50 without error.

Figure 7:
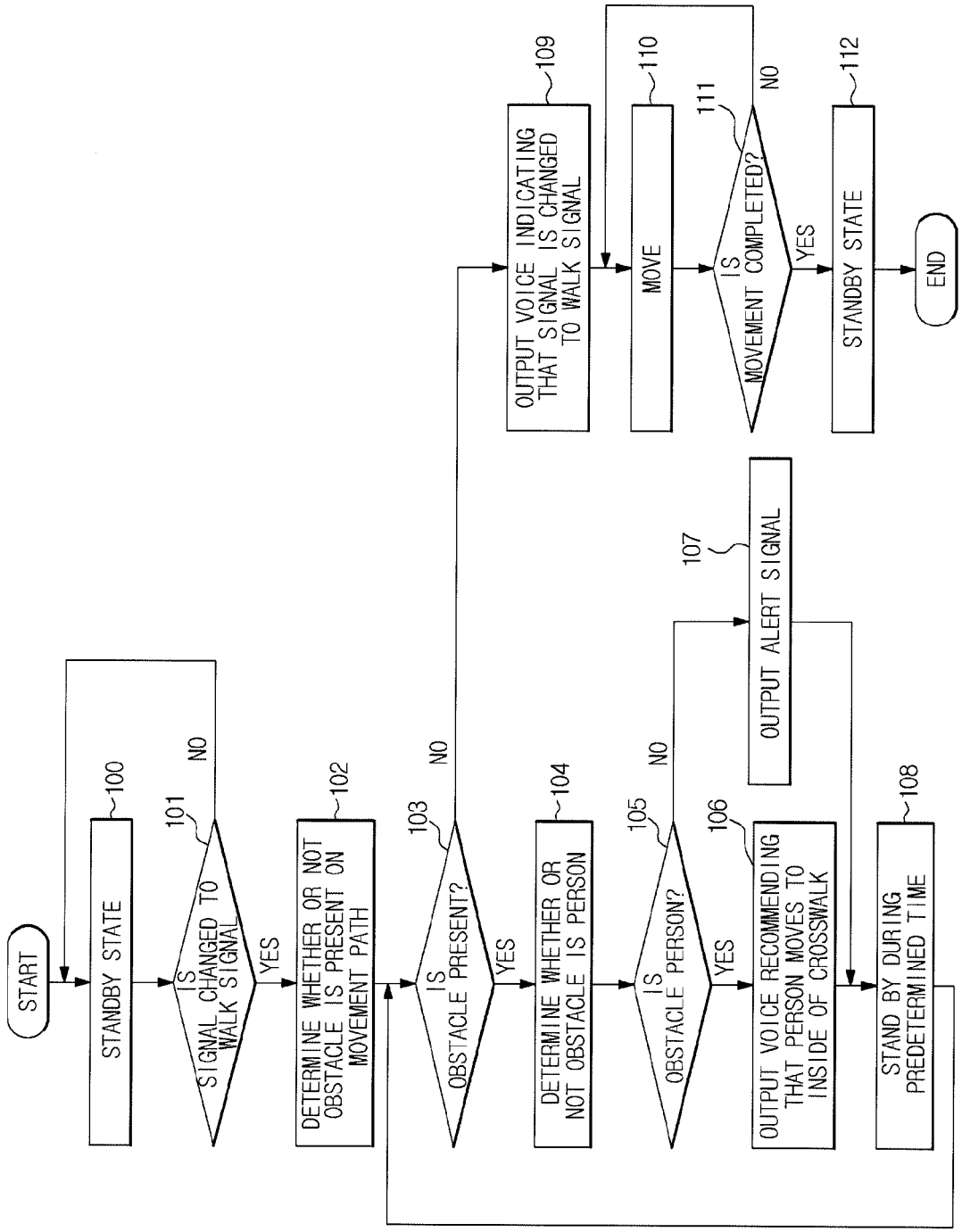
FIG. 7 is a flowchart illustrating a method of controlling a crosswalk walking assistance system according to an embodiment.

FIG. 7 is a flowchart illustrating a method of controlling a crosswalk walking assistance system according to an embodiment.

The crosswalk walking assistance system in which the robot 30 moves along the guide rail 10 will be described with reference to FIG. 7. In the crosswalk walking assistance system in which the robot 30 moves along the guide line 50, a measurement process of the conductivity sensor and the pressure sensor provided on the guide rail 10 is omitted.

In a stop signal, the robot 30 is in a standby state on one end of the guide rail 10 or the guide line 50 (100).

If the signal of the traffic lights is changed to a walk signal (101), the controller 20 transmits information indicating that the signal of the traffic lights is changed to the walk signal to the robot 30 and the robot 30 determines whether or not an obstacle is present on the movement path before moving to the other side of the crosswalk (102). If the signal of the traffic lights is not changed to the walk signal, the robot 30 is continuously maintained in the standby state. The robot 30 may determine whether or not an obstacle is present on the movement path using an obstacle sensor.

If it is determined that the obstacle is present (103), the robot 30 determines whether or not the obstacle is a person (104).

The robot 30 analyzes the information sensed using the infrared sensor, the distance sensor and the camera of the sensor unit 33 and the conductivity sensor and the pressure sensor of the guide rail 10 so as to determine whether or not the obstacle is a person. In case of using the guide line 50, the information sensed using the infrared sensor, the distance sensor and the camera of the sensor unit 33 is analyzed so as to determine whether or not the obstacle is a person.

If it is determined that the obstacle is a person, the robot 30 outputs a voice signal recommending that the person move to the inside of the crosswalk through the speaker 37 (106).

If it is determined that the obstacle is not a person, the robot 30 outputs an alert signal indicating that a pedestrian may be in danger when walking because an obstacle is present on the boundary line of the crosswalk through the speaker 37 (107).

The robot 30 stands by during a predetermined time (about 2 to 5 seconds) after outputting the voice signal or the alert signal, in consideration of a time when a pedestrian moves to the inside of the crosswalk or a time when an obstacle deviates from the crosswalk (108).

After the predetermined time, the robot 30 determines whether an obstacle is present on the movement path again (103) and outputs a voice signal indicating that the signal of the traffic lights is changed to the walk signal through the speaker 37 if the obstacle is not present (109).

Thereafter, the robot 30 moves to the other side of the crosswalk along the guide rail 10 or the guide line 50 (110).

The robot 30 determines whether or not the movement of the robot to the other side of the crosswalk is completed (111), maintains the standby state at that position until the signal of the traffic lights is changed to a next walk signal if the movement is completed (112), and continuously moves if the movement is not completed yet. The information about the movement distance of the crosswalk may be input to the control unit 34 of the robot 30 in advance. The control unit 34 may determine whether or not the movement is completed, by determining whether or not the robot 30 moves by the input distance. Alternatively, the robot 30 may determine whether or not the robot 30 arrives at the other side of the crosswalk using the sensor of the sensor unit 33.

Figure 8:
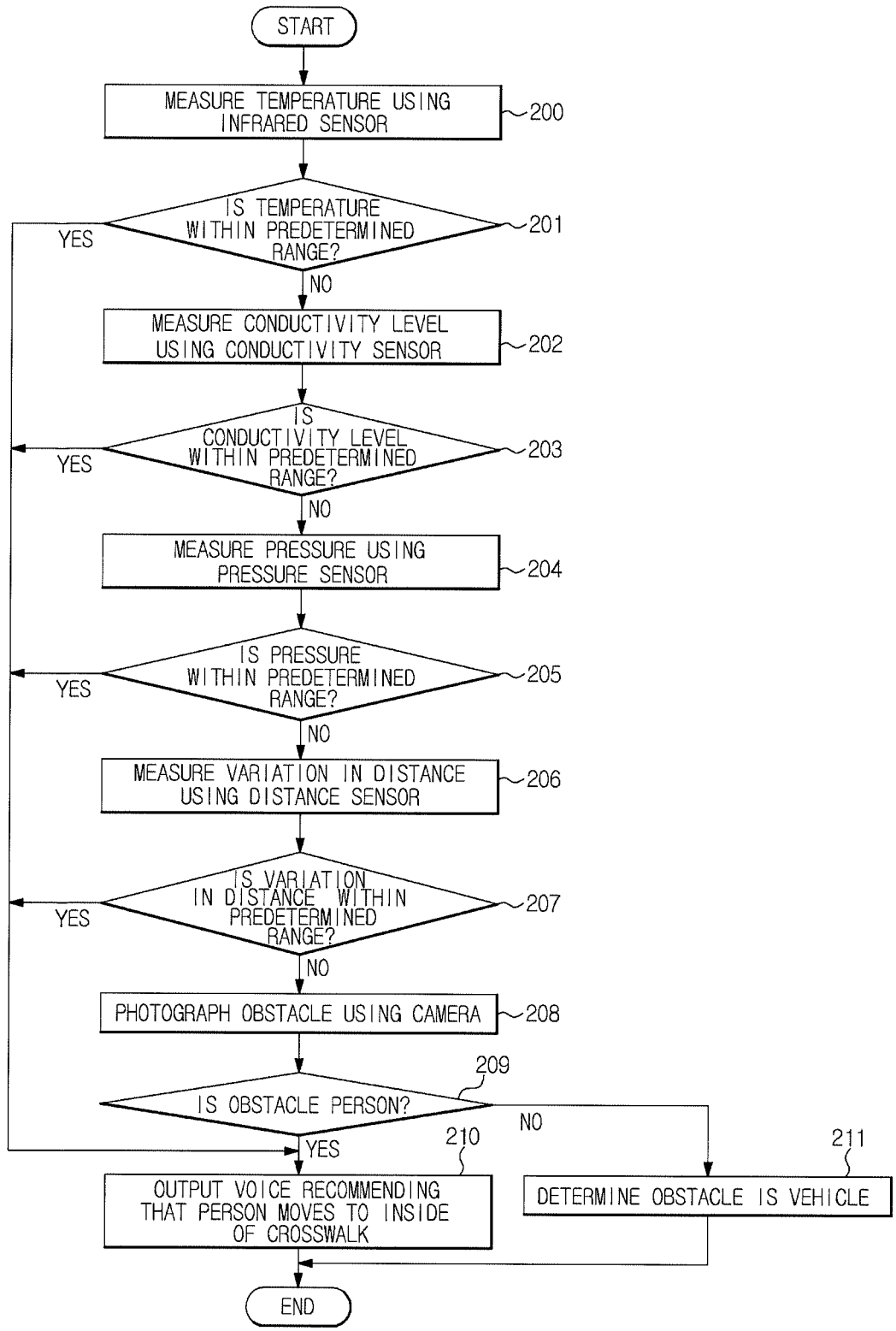
FIG. 8 is a flowchart illustrating a method of determining whether or not an obstacle is a person in a crosswalk walking assistance system according to an embodiment.

FIG. 8 is a flowchart illustrating a method of determining whether or not an obstacle is a person in a crosswalk walking assistance system according to an embodiment.

FIG. 8 shows Operations 104 and 105 of FIG. 7 in detail. The crosswalk walking assistance system in which the robot 30 moves along the guide rail 10 will be described with reference to FIG. 8. In the crosswalk walking assistance system in which the robot 30 moves along the guide line 50, a measurement process of the conductivity sensor and the pressure sensor provided on the guide rail 10 is omitted.

If it is determined that the obstacle is present on the movement path of the robot 30, the robot 30 determines whether or not the obstacle is a person. The robot 30 determines whether or not the obstacle is a person, using the infrared sensor, the distance sensor and the camera of the sensor unit 33 and the conductivity sensor and the pressure sensor of the guide rail 10.

The robot 30 measures the temperature of the obstacle using the infrared sensor (200). The control unit 34 determines whether or not the temperature of the obstacle measured using the infrared sensor is within a predetermined range (201).

If the temperature of the obstacle is not within the predetermined range, the robot 30 measures the conductivity level of the obstacle using the conductivity sensor of the guide rail 10 (202). The control unit 34 determines whether or not the conductivity level of the obstacle measured using the conductivity sensor is within a predetermined range (203).

If the conductivity level of the obstacle is not within the predetermined range, the robot 30 measures pressure generated by the weight of the obstacle using the pressure sensor of the guide rail 10 (204). The control unit 34 determines whether or not the pressure generated by the weight of the obstacle measured using the pressure sensor is within a predetermined range (205).

If the pressure generated by the weight of the obstacle measured using the pressure sensor is not within the predetermined range, the robot 30 measures a variation in distance based on the movement speed of the obstacle using the distance sensor (206). The control unit 34 determines whether or not the variation in distance based on the movement speed of the obstacle measured using the distance sensor is within a predetermined range (207).

If the variation in distance based on the movement speed of the obstacle measured using the distance sensor is not within the predetermined range, the robot 30 directly photographs the obstacle using the camera (208). The control unit 34 determines whether or not the image of the obstacle photographed using the camera is a person (209).

If the image of the photographed obstacle is a person, the robot 30 outputs a voice signal recommending that the person move to the inside of the crosswalk through the speaker 37 (210).

If the image of the photographed obstacle is not a person, the robot 30 determines that the obstacle is a vehicle (211).

According to embodiments, when a pedestrian crosses at a crosswalk, a movable robot moves along with the pedestrian along a boundary line of the crosswalk. Thus, the pedestrian may safely cross at the crosswalk.

Since the speed of a vehicle may be measured using the robot, it is possible to expose the violation of a speed limit or traffic regulations so as to enable the vehicle to be safely driven.

Embodiments can be implemented in computing hardware and/or software, such as (in a non-limiting example) any computer that can store, retrieve, process and/or output data and/or communicate with other computers. For example, controller 20 may include a computer to perform operations described herein. Similarly, robot 30 may include a computer to perform operations described herein. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc—Read Only Memory), and a CD-R (Recordable)/RW.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A crosswalk walking assistance system comprising:
    guide rails along boundary lines of a crosswalk, the boundary lines at both sides of a width of the crosswalk, the boundary lines crossing a road on which vehicles run;
    robots configured to move along the guide rails; and
    a controller electrically connected to the robots through the guide rails, the controller configured to transmit information indicating that a traffic signal is changed from a stop signal to a walk signal to the robots so that,
        (i) the robots are configured to determine whether or not an obstacle is present on movement paths of the robots before crossing the crosswalk,
        (ii) if it is determined that the obstacle is present, the robots determine whether or not the obstacle is a person,
        (iii) if it is determined that the obstacle is a person, the robots output a voice signal recommending that the person moves to an inside of the crosswalk,
        (iv) if it is determined that the obstacle is not a person, the robots output an alert signal, and
        (v) if it is determined that there is no obstacle, the robots output a voice signal indicating that the traffic signal is changed to a walk signal.

2. The crosswalk walking assistance system according to claim 1, wherein
    the robots is configured to move along the guide rails formed on the boundary lines forward and backward, and
    the robots are provided on the guide rails, respectively.

3. The crosswalk walking assistance system according to claim 1, wherein
    each of the guide rails includes a sensor to sense an object passing through the respective guide rail, and
    the sensor includes a conductivity sensor and a pressure sensor.

4. The crosswalk walking assistance system according to claim 1, wherein:
    the controller includes
        a power supply configured to supply power to the robots, and
        a communication unit configured to perform communication between traffic lights and the robots.

5. The crosswalk walking assistance system according to claim 1, wherein the robots are configured to determine whether or not the robots completely cross the crosswalk, and if it is determined that the robots completely cross the crosswalk, the robots are configured to maintain a standby state at that position until the traffic signal changes to a next walk signal.

6. The crosswalk walking assistance system according to claim 1, wherein each of the robots includes:
    a driving unit;
    a sensor unit configured to sense variation in surrounding circumstances;
    a power reception unit configured to receive power;
    a communication unit configured to perform communication between the controller and another robot of said robots; and
    a control unit configured to control the driving unit according to signals transmitted from the sensor unit and the communication unit.

7. The crosswalk walking assistance system according to claim 6, wherein the power reception unit is configured to receive power from the controller through a guide rail of the guide rails.

8. The crosswalk walking assistance system according to claim 6, wherein the communication unit is configured to receive a signal of traffic lights from the controller and transmit information sensed by the sensor unit of the at least one of the robots to another one of the robots, or receive information sensed by the sensor unit of the another one of the robots.

9. The crosswalk walking assistance system according to claim 6, wherein
    the sensor unit includes at least one of a camera, an infrared sensor, a distance sensor, or an obstacle sensor, and
    a plurality of sensor units are provided outside at least one of the robots.

10. The crosswalk walking assistance system according to claim 9, wherein the robots are configured to analyze information sensed by the sensor unit and determine as to whether or not the obstacle is a person.

11. The crosswalk walking assistance system according to claim 9, wherein the robots are configured to stand by for a set time after outputting the voice signal or the alert signal, in consideration of a time during which the pedestrian moves to an inside of the crosswalk or an obstacle deviates from the crosswalk.

12. The crosswalk walking assistance system according to claim 11, wherein the robots are configured to determine again whether an obstacle is present on the movement path, and output a voice signal indicating that the traffic signal is changed to the walk signal if the obstacle is not present.

13. A crosswalk walking assistance system comprising:
    guide lines along boundary lines of a crosswalk, the boundary lines at both sides of a width of the crosswalk, the boundary lines crossing a road on which vehicles run;
    robots configured to move along the guide lines; and
    controllers provided on ends of the guide lines and electrically connected to the robots through the guide lines, the controller configured to transmit information indicating that a traffic signal is changed from a stop signal to al walk signal to the robots so that, (i) the robots are configured to determine whether or not an obstacle is present on movement path of the robots before crossing the crosswalk, (ii) if it is determined that the obstacle is present, the robots determine whether or not the obstacle is a person, (iii) if it is determined that the obstacle is a person, the robots output a voice signal recommending that the person moves to the inside of the crosswalk, (iv) if it is determined that the obstacle is not a person, the robots output an alert signal, and (v) if it is determined that there is no obstacle, the robots output a voice signal indicating that the traffic signal is changed to a walk signal.

14. The crosswalk walking assistance system according to claim 13, wherein each of the robots includes:

a sensor configured to recognize a corresponding one of the guide lines;

a docking unit being in contact with the controller, the docking unit configured to receive power; and a battery configured to store power received from the controller.

15. The crosswalk walking assistance system according to claim 14, wherein the sensor includes at least one of an infrared sensor or a hall sensor.

16. The crosswalk walking assistance system according to claim 13, wherein the guide lines have a color different from that of a road surface and have reflectivity different from that of the road surface.

17. The crosswalk walking assistance system according to claim 13, wherein the guide lines include a magnetic material.

18. The crosswalk walking assistance system according to claim 13, wherein each of the controllers includes:

a docking unit being in contact with a respective robot of the robots, the docking unit configured to supply power; and a beacon signal unit configured to transmit a beacon signal to the respective robot so as to recognize the position of the respective robot.

19. A method comprising:

sensing, by a robot, whether or not an obstacle is present on a movement path of the robot when information indicating that a signal of a traffic light is changed to a walk signal is received by the robot from a controller;

moving the robot along a guide rail or a guide line while outputting a voice signal indicating that the signal is changed to the walk signal, when it is sensed by the robot that an obstacle is not present, the guide rail or the guide line along a boundary line, the boundary line at a side of a width of the crosswalk and crossing a road on which vehicles run;

determining, by the robot, whether or not the obstacle is a person when it is sensed by the robot that an obstacle is present, and outputting a voice signal by the robot recommending that the person moves to an inside of a crosswalk;

outputting a voice signal recommending that the person moves to an inside of the crosswalk when it is determined that the obstacle is a person;

generating an alert signal by the robot to remove the obstacle when it is determined that the obstacle is not a person;

moving the robot along the guide rail or the guide line to thereby move to the other side of the crosswalk while outputting a voice signal indicating that the signal has changed to the walk signal when the obstacle is removed; and outputting an indication by the robot that the signal has changed to a stop signal when movement of the robot to the other side of the crosswalk is completed, and then waiting by the robot until the signal is changed to the walk signal.

20. The method according to claim 19, wherein the signal of the traffic light is transmitted from the controller through the guide rail or is wirelessly transmitted to the robot.

21. The method according to claim 19, wherein the determining of whether or not the obstacle is a person includes:

measuring a temperature of the obstacle using an infrared sensor of the robot so as to determine whether or not the obstacle is a person;

measuring a conductivity level of the obstacle using a conductivity sensor of the guide rail so as to determine whether or not the obstacle is a person, when the temperature is not within a predetermined range;

measuring pressure generated by the obstacle using a pressure sensor of the guide rail so as to determine whether or not the obstacle is a person, when the conductivity level is not within a predetermined range;

measuring a variation in distance based on a movement speed of the obstacle using a distance sensor of the robot so as to determine whether or not the obstacle is a person, when the pressure is not within a predetermined range;

photographing the obstacle using a camera of the robot so as to determine whether or not the obstacle is a person based on the photographed image, when the variation in distance is not within a predetermined range; and determining that the obstacle is a vehicle when the image is not a person.

22. The method according to claim 21, wherein the predetermined ranges are ranges of information measured by the sensors when the obstacle is a person.

23. The method according to claim 19, wherein the moving of the robot along the guide rail or the guide line includes moving first and second robots, which are located on guide rails or guide lines provided on opposite boundary lines of the crosswalk so as to face each other in a diagonal direction, in opposite directions.

24. The method according to claim 19, wherein the moving of the robot along the guide rail or the guide line includes transmitting a signal for requesting extension of a walk signal time to the controller and extending the walk signal time, when the movement of the robot through the crosswalk is not completed within a walk signal time.

25. The method according to claim 19, wherein the moving of the robot along the guide rail or the guide line includes:

when a walk signal time is insufficient to move the robot to the other side of the crosswalk, increasing a movement speed of the robot to a predetermined upper-limit movement speed when the increased movement speed would allow the robot to move to the other side of the crosswalk, and returning the robot to an original position when the robot cannot be moved to the other side of the crosswalk at the predetermined upper-limit movement speed.

26. A system comprising:
a guide rail along a boundary line of a crosswalk, the boundary lines at both sides of a width of the crosswalk, and the boundary lines crossing a road on which vehicles run;
a robot configured to move along the guide rail; and
a controller connected to the guide rail, the controller configured to,
  control the robot by providing power and signals through the guide rail,
  transmit information indicating that a traffic signal is changed from a stop signal to a walk signal to the robots so that,
    the robot determines whether or not an obstacle is present on a movement path of the robot before crossing the crosswalk, and
    if it is determined that the obstacle is present, the robot determines whether or not the obstacle is a person, and
output an alert signal if it is determined that the obstacle is not a person, a first voice signal recommending that a pedestrian moves to an inside of the crosswalk if it is determined that the obstacle is a person, and a second voice signal indicating that the traffic signal is changed to a walk signal if it is determined that there is no obstacle.

* * * * *